US006292859B1

(12) United States Patent
Santiago (10) Patent No.: US 6,292,859 B1
(45) Date of Patent: Sep. 18, 2001

(54) AUTOMATIC SELECTION OF AN UPGRADE CONTROLLER IN AN EXPANSION SLOT OF A COMPUTER SYSTEM MOTHERBOARD HAVING AN EXISTING ON-BOARD CONTROLLER

(75) Inventor: Christopher Santiago, Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/179,274

(22) Filed: Oct. 27, 1998

(51) Int. Cl.⁷ ........................................... G06F 13/00
(52) U.S. Cl. .................... 710/107; 710/104; 710/10; 713/1; 713/100
(58) Field of Search ..................... 710/104, 107, 710/102, 2, 8, 10, 11; 71/1–2, 100

(56) References Cited

U.S. PATENT DOCUMENTS

| | | | |
|---|---|---|---|
| 5,170,472 | * | 12/1992 | Cwiakala et al. ..................... 710/8 |
| 5,257,368 | * | 10/1993 | Benson et al. ........................ 707/1 |
| 5,257,387 | * | 10/1993 | Richek et al. ...................... 713/600 |
| 5,727,208 | * | 3/1998 | Brown ................................. 713/100 |
| 5,881,252 | * | 3/1999 | Sahgal et al. ...................... 710/104 |
| 5,923,860 | * | 7/1999 | Olarig ................................ 710/129 |
| 6,035,355 | * | 3/2000 | Kelley et al. ...................... 710/101 |

* cited by examiner

Primary Examiner—Robert Beausoleil
Assistant Examiner—X. Chung-Trans
(74) Attorney, Agent, or Firm—Conley, Rose & Tayon, P.C.

(57) ABSTRACT

A computer system that automatically detects and configures an upgrade peripheral controller(s) when present in an expansion slot(s) during the computer system startup, or otherwise, enables and configures an on-board peripheral controller(s). The selection of either a peripheral controller on the computer system motherboard or an upgrade peripheral controller plugged into an expansion slot is automatically determined during startup of the computer system. The logic circuit and software used to accomplish this automatic selection do not degrade the performance of the selected peripheral controller during normal operation of the computer system since non-critical timing direct current (DC) level signals are utilized. No additional logic gates which could cause additional time delays are introduced into critical timing signal paths. No hardwired jumpers are needed nor desired for automatic selection of the desired peripheral controller during startup of the computer system.

21 Claims, 5 Drawing Sheets

AUTOMATIC SELECTION OF AN UPGRADE CONTROLLER IN AN EXPANSION SLOT OF A COMPUTER SYSTEM MOTHERBOARD HAVING AN EXISTING ON-BOARD CONTROLLER

BACKGROUND OF THE INVENTION

1 Field of the Invention

The present invention relates to a computer system having an on-board controller(s) and an expansion slot(s) for an upgrade controller(s), and more particularly, to automatically detecting and configuring the upgrade controller(s) when present in the expansion slot(s) during computer system startup, or otherwise, enabling and configuring the on-board controller(s).

2 Description of the Related Technolgy

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("e-mail"), document databases, video teleconferencing, whiteboarding, integrated enterprise calendar, virtual engineering design and the like. Multiple network servers may also be interconnected by local area networks "LAN") and wide area networks ("WAN").

A computer system has a plurality of information (data and address) buses such as a host bus, a memory bus, high speed expansion buses such as the Accelerated Graphics Port (AGP) bus, the Peripheral Component Interconnect (PCI) bus, and other peripheral buses such as the Small Computer System Interface (SCSI), Extension to Industry Standard Architecture (EISA), Universal Serial Bus (USB) and Industry Standard Architecture (ISA). The microprocessor(s) (CPU) of the computer system communicates with main memory and with the peripherals that make up the computer system over these various buses. The microprocessor(s) communicates to the main memory over a host bus to memory bus bridge. The main memory generally communicates over a memory bus through a cache memory bridge to the CPU host bus. The peripherals, depending on their data transfer speed requirements, are connected to the various buses which are connected to the microprocessor host bus through bus bridges that detect required actions, arbitrate, and translate both data and addresses between the various buses.

The choices available for the various computer system bus structures and devices residing on these buses are relatively flexible and may be organized in a number of different ways. One of the more desirable features of present day personal computer systems is their flexibility and ease in implementing custom solutions for users having widely different requirements. Slower peripheral devices may be connected to the ISA or EISA bus(es), other peripheral devices, such as disk and tape drives may be connected to a SCSI bus, and the fastest peripheral devices such as network interface cards (NICs) and video graphics controllers may require connection to the PCI and AGP buses, respectively.

A more complete definition of the PCI bus may be found in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure, " dated May 20, 1996, the disclosures of which are hereby incorporated by reference. These PCI specifications and ECN are available from the PCI Special Interest Group, P.O. Box 14070, Portland, Oreg. 97214.

The AGP bus has sufficient bandwidth for a graphics controller to retrieve textures from system memory without materially affecting computer system performance for other non-graphics operations. The Intel 3-D graphics standard is a specification, which provides signal, protocol, electrical, and mechanical specifications for the AGP bus and devices attached thereto. This specification is entitled "Accelerated Graphics Port Interface Specification version 2.0," dated May 4, 1998; and also "Accelerated Graphics Port Interface Specification version 1.0," dated Jul. 31, 1996 are hereby incorporated by reference. The AGP specification, both versions 2.0 and 1.0, are available from Intel Corporation, Santa Clara, Calif. The AGP specification creates an independent and additional high speed local bus for use by 3-D graphics devices such as a graphics controller, wherein the other input-output "I/O") devices of the computer system may remain on any combination of the PCI, SCSI, EISA and ISA buses.

Another advance in the flexibility and ease in the implementation of personal computers is the emerging "plug and play" standard in which each vendor's hardware has unique coding embedded within the peripheral device. Plug and play software in the computer operating system software auto configures the peripheral devices found connected to the various computer buses such as the various PCI buses, EISA and ISA buses. In addition, the plug and play operating system software configures registers within the peripheral devices found in the computer system as to memory space allocation, interrupt priorities and the like.

Plug and play initialization generally is performed with a system configuration program that is run whenever a new device is incorporated into the computer system. Once the configuration program has determined the parameters for each of the devices in the computer system, these parameters may be stored in non-volatile random access memory (NVRAM). An industry standard for storage of both plug and play and non-plug and play device configuration information is the Extended System Configuration Data (ESCD) format. The ESCD format is used to store detailed configuration information in the NVRAM for each device. This ESCD information allows the computer system read only memory (ROM) basic input/output system (BIOS) configuration software to work together with the configuration utilities to provide robust support for all peripheral devices, both plug and play, and non- plug and play.

During the first initialization of a computer, the system configuration utility determines the hardware configuration of the computer system including all peripheral devices connected to the various buses of the computer system. Some user involvement may be required for device interrupt priority and the like. Once the configuration of the computer system is determined, either automatically and/or by user selection of settings, the computer system configuration information is stored in ESCD format in the NVRAM. Thereafter, the system configuration utility need not be run again. This greatly shortens the startup time required for the computer system and does not require the computer system user to have to make any selections for hardware interrupts and the like, as may be required in the system configuration utility.

A significant part of the ever increasing popularity of the personal computer, besides its low cost relative to just a few years ago, is its ability to run sophisticated programs and perform many useful and new tasks. A major advance in the performance of personal computers (both workstation and network servers) has been the implementation of sophisticated peripheral devices having controllers connected to the various aforementioned computer system buses such as, for example but not limitation: video graphics adapters, local area network interfaces, SCSI bus adapters, redundant error checking and correcting disk array controller, and the like. The controllers for the various computer system peripherals may reside on the computer system motherboard for initial low cost implementation. However, it may be desirable to upgraded the computer system with newer or more sophisticated plug-in controllers for desired peripherals having added flexibility and/or enhanced performance.

Peripheral buses like AGP, ISA and the like, cannot address two devices having the same physical address. There will be data contention. The PCI bus has an IDSEL signal to configure a device during POST. Therefore, for example, when selecting either an AGP controller on the computer system motherboard or a upgrade AGP controller plugged into an AGP expansion slot, generally, a physical jumper must be changed. This may create additional expense, increased setup time (if external logic is used in a signal line such as the AGP FRAME), and potential hardware problems since the computer system must be opened and preferably serviced by an experienced technician. What is needed is an apparatus and method for selection of either a peripheral controller on the computer system motherboard or a upgrade peripheral controller plugged into an expansion slot in a computer system that is transparent to the computer user, automatically operable during POST and which does not degrade normal operation of the selected peripheral controller.

SUMMARY OF THE INVENTION

The present invention overcomes the above-identified problems as well as other shortcomings and deficiencies of existing technologies by providing in a computer system an apparatus and method for selection of either a peripheral controller on the computer system motherboard or an upgrade peripheral controller plugged into an expansion slot. The selection of the appropriate peripheral controller is done automatically during startup of the computer system. In addition, the invention is readily adapted to disable selected peripheral controllers of, for example, a particular bus. The logic and software used to accomplish this selection do not degrade in any way the perfonnance of the selected peripheral controller during normal operation of the computer system. For implementation of the apparatus and method of the present invention, non-critical timing direct current (DC) level signals are utilized. No additional logic gates which could cause additional time delays are introduced into critical timing signal paths. No hardwired jumpers are needed nor desired for selection of the peripheral controller, according to the present invention.

For illustrative purposes, preferred embodiments of the present invention are described hereinafter for computer systems utilizing the Intel x86 microprocessor architecture and certain terms and references will be specific to that processor platform. AGP and PCI are interface standards, however, are hardware independent and may be utilized with any host computer designed for these interface standards. It will be appreciated by those skilled in the art of computer systems that the present invention may be adapted and applied to any computer platform utilizing peripheral controllers on the motherboard and having expansion slots connected to the various computer system I/O buses for the addition of new or upgrade peripheral controllers. Computer system I/O buses for example, but not limitation are: AGP, PCI, LPC (low pin count), EISA, ISA, SCSI, and the like. An on-board peripheral controller may also be referred to herein as a down controller, and a plug-in upgrade peripheral controller may be referred to herein as an up controller.

An embodiment of the present invention selects either an on-board AGP graphics controller or an optional plug-in upgrade AGP graphics controller. The logic circuitry for the on-board AGP graphics controller is typically proximate to a core logic chipset which controls signals to and from the host processor(s), memory, and AGP and PCI buses. An AGP expansion slot having an AGP connector, more fully defined in the AGP specification incorporated by reference hereinabove, may preferably be located between the on-board AGP graphics controller and the core logic chipset. Glue logic, according to the present invention, may also reside on the motherboard proximate to the on-board AGP graphics controller and the AGP expansion slot connector.

According to the present invention, a signal, either active high or active low, referred to hereinafter as "AGPDN_DIS" (AGP down disable) signal is asserted and keeps the on-board AGP graphics controller in its reset mode using the "RESET#" (active low) signal which is more fully described in the AGP and PCI specifications referenced hereinabove. AGP devices generally do not have an IDSEL like in the PCI specification, thus individual selection of different AGP devices was not contemplated in the AGP specifications referenced above and incorporated by reference herein. The present invention overcomes the lack of AGP device selection or that of any other type of I/O specification since, generally, all I/O devices will have a DC level reset (RESET#) function which, when asserted, causes that device to be inoperative in the computer system. Typically, an inoperative I/O device will have its tri-state bus drivers disabled and in a high impedance state so as not to load the bus connected thereto, and not respond to any bus cycles.

During the computer system startup power-on-self-test (POST), if an up controller is inserted in the AGP expansion connector, it will be enabled, i.e., the RESET# signal connected thereto will be deactivated so that it may respond to PCI queries during POST by asserting the FRAME# signal (more fully described in the PCI specification referred to hereinabove). The down controller on the motherboard has the RESET# signal connected thereto asserted, thus the down controller cannot response to any PCI queries. If there is an up controller in the AGP expansion connector, it will respond during POST and be configured for proper operation in the computer system. If an up controller does not respond during POST, the present invention causes the AGPDN_DIS signal to be deasserted. Once the AGPDN_DIS signal deasserts, the RESET# signal to the down controller deactivates, thus allowing the down controller to respond and be configured during POST. A time delay may be inserted between deassertion of the AGPDN_DIS and down controller RESET# signals. A time delay may be determined so that the computer system signal setup criteria are maintained. As an example, but not limitation, a one millisecond time delay may be used in the present embodiment.

A preferred implementation of the embodiment of the AGP up and down controller selection logic is a non-inverting tri-state output signal buffer having an inverting driver enable input, and a pull down resistor connected between system ground and the common connection of the output of this buffer and the RESET# input of the down controller. When the a logic 1 signal (AGPDN_DIS=1) is applied to the enable input of the buffer, the tri-state output is disabled and the pull down resistor connected thereto causes the down controller RESET# input to be asserted (active low), thus the down controller is always initially disabled on the computer system motherboard. When a logic 0 signal (AGPDN_DIS=0) is applied to the enable input of the buffer, the tri-state output is enabled and the down controller RESET# input follows the computer system RESET# signal. According to the present invention, during POST the RESET# signal is disabled, thus the down controller may respond and be configured (in the absence of an up controller being present in the AGP connector). The AGPDN_DIS signal may come from the computer system core logic chipset, the SIO (Super I/O) logic associated with the ROM BIOS or from any peripheral logic associated with the computer system.

Another preferred embodiment comprises an AND gate connected between the computer peripheral RESET# input and the computer system RESET# signal. An AND gate is provided for each peripheral to disable its respective peripheral by holding that peripheral's RESET# signal input low whenever an AGPDN_DIS# is asserted (active low) for the down peripheral, or an AGP_UP# is asserted (active low) for the up peripheral. Any number of option peripherals may be disabled or enabled in this manner.

Another embodiment of the invention allows the disabling of all or a portion of a bus and/or peripherals connected thereto in the computer system. For example, a computer system may have ISA on-board peripheral devices and ISA connectors for plug-in peripherals which may be effectively disabled without introducing time delays in the peripheral signal paths when re-enabled. Typically, peripheral controllers were disabled by inserting logic gates into critical timing signal paths. These logic gates introduced propagation time delays into control signal paths which could degrade computer system performance. In the present invention, only the RESET# signal is affected, thus, there is no addition time delays introduced into critical timing signal paths.

Each peripheral controller or upgrade connector for an optional upgrade peripheral controller is connected to a respective RESET# signal controlled in the manner described hereinabove. The computer system may thus enable or disable any of these peripheral controllers. When a particular peripheral controller is enabled by the computer system, its respective RESET# signal will follow the computer system RESET# signal. The present invention adds no additional propagation delays in critical signal timing paths, only the RESET# signal timing is slightly affected, but the RESET# signal does not have critical timing requirements.

An advantage of the present invention is that no hardwired jumpers need to be changed for the computer system to recognize and configure either the up or down controller.

Another advantage is that no additional gates are connected into signal paths having critical timing.

A feature of the present invention is that the on-board down controller is first disabled so that an add-in up controller may be detected during POST automatically, and if the up controller is not detected during POST, the down controller is automatically enabled so as to respond during the POST bus enumeration and device configuration.

Another advantage of the present invention is that automatic selection of either an up or down controller is performed without a hardware jumper having to be physically changed.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENT

The present invention is an apparatus and method, in a computer system, for automatically detecting and configuring an upgrade peripheral controller(s) when present in an expansion slot(s) of the computer system motherboard during the computer system startup, or otherwise, enabling and configuring the on-board controller(s). Selection of either the peripheral controller on the computer system motherboard or the upgrade peripheral controller plugged into an expansion slot is automatically determined during startup of the computer system. The logic circuit and software used to accomplish this automatic selection do not degrade the performance of the selected peripheral controller during normal operation of the computer system. The invention may also be utilized to disable specific peripheral controllers or even an entire bus system of peripheral controllers. For implementation of the apparatus and method of the invention, non-critical timing direct current (DC) level signals are utilized. No additional logic gates which could cause additional time delays are introduced into critical timing signal paths. No hardwired jumpers are needed nor desired for selection of the desired peripheral controller, disabling of peripheral controllers individually, or all peripheral controllers of a particular bus system.

For illustrative purposes, prior art references and preferred embodiments of the present invention are described hereinafter for computer systems utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing peripheral controllers on the motherboard and having expansion slots connected to the various computer system I/O buses for the addition of new or upgrade peripheral controllers. In addition, any computer system bus having peripheral controllers may be disabled according to the embodiments of the invention, more fully described hereinbelow. Computer system I/O buses for example, but not limitation are: AGP, PCI, LPC (low pin count), EISA, ISA, SCSI, and the like. An on-board peripheral controller may also be referred to herein as a down controller, and a plug-in upgrade peripheral controller may be referred to herein as an up controller.

Figure 1:
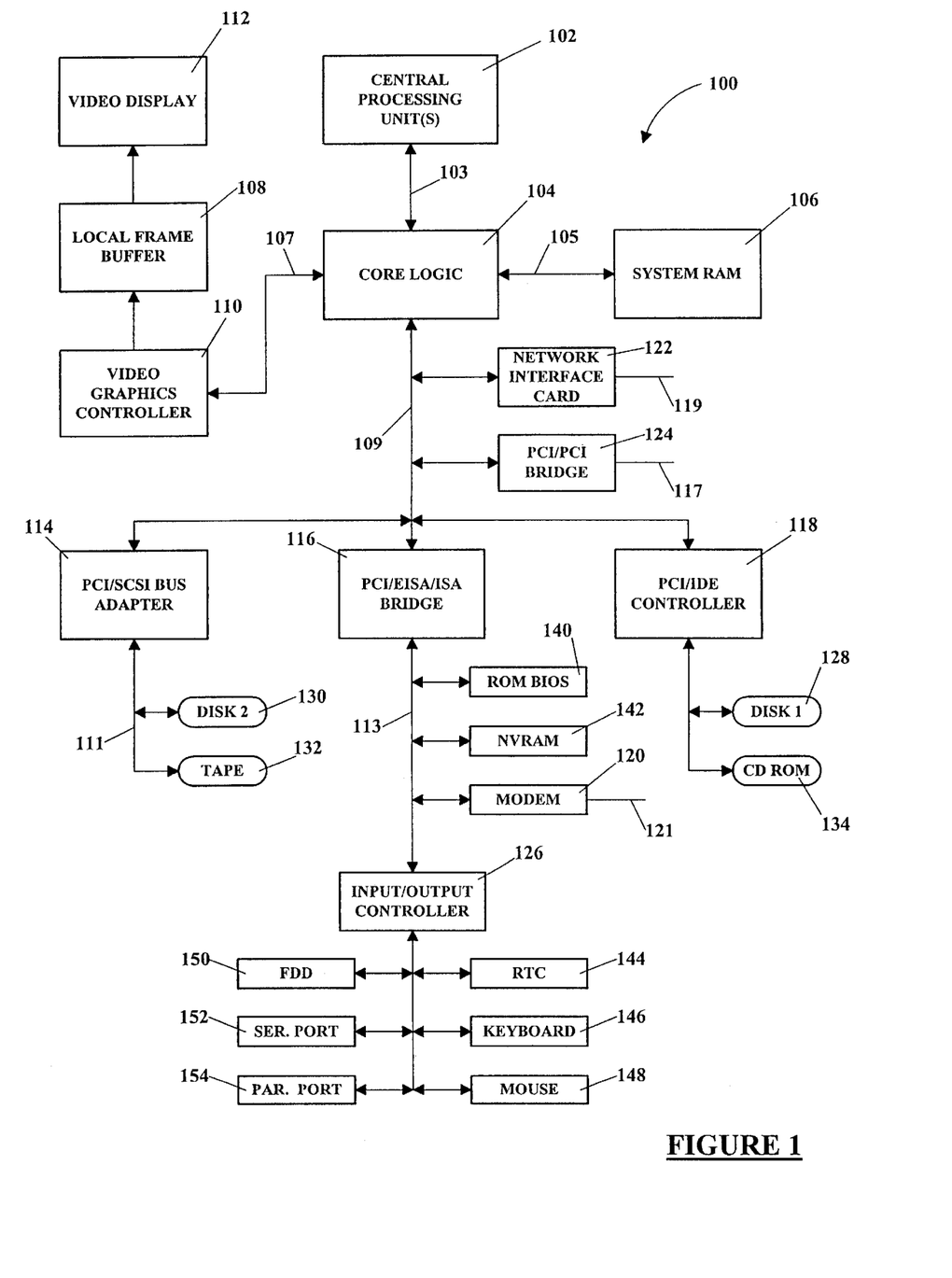
FIG. 1 is a schematic block diagram of a computer system according to the present invention.

Referring now to the drawings, the details of preferred embodiments of the invention are schematically illustrated. Like elements in the drawings will be represented by like numbers, and similar elements will be represented by like numbers with a different lower case letter suffix. Referring now to FIG. 1, a schematic block diagram of a computer system utilizing the present invention is illustrated. A computer system is generally indicated by the numeral 100 and comprises a central processing unit(s) (CPU) 102, core logic 104, system random access memory("RAM") 106, a video graphics controller 110, a local frame buffer 108, a video display 112, a PCI/SCSI bus adapter 114, a PCI/EISA/ISA bridge 116, and a PCI/IDE controller 118. Single or multi-level cache memory (not illustrated) may also be included in the computer system 100 according to the current art of microprocessor computer systems. The CPU 102 may be a plurality of CPUs 102 in a symmetric or asymmetric multi-processor configuration. The video graphics controller 110 may also be referred to hereinafter as an "AGP processor."

The CPU(s) 102 is connected to the core logic 104 through a host bus 103. The system RAM 106 is connected to the core logic 104 through a memory bus 105. The video graphics controller 110 is connected to the core logic 104 through an AGP bus 107. The PCI/SCSI bus adapter 114, PCI/EISAIISA bridge 116, and PCI/IDE controller 118 are connected to the core logic 104 through a PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (see FIG. 2). An AGP connector is also on the computer system 100 motherboard for connecting to an upgrade AGP video graphics controller.

Hard disk 130 and tape drive 132 may be connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, a serial port 152, and a parallel port 154. The EISA/ISA bus 113 is a slower information bus than the PCI bus 109, but it costs less to interface with the EISA/ISA bus 113. The PCI/IDE controller 118 interfaces hard disk 128 and CD ROM drive 134 to the PCI bus 109.

Figure 2:
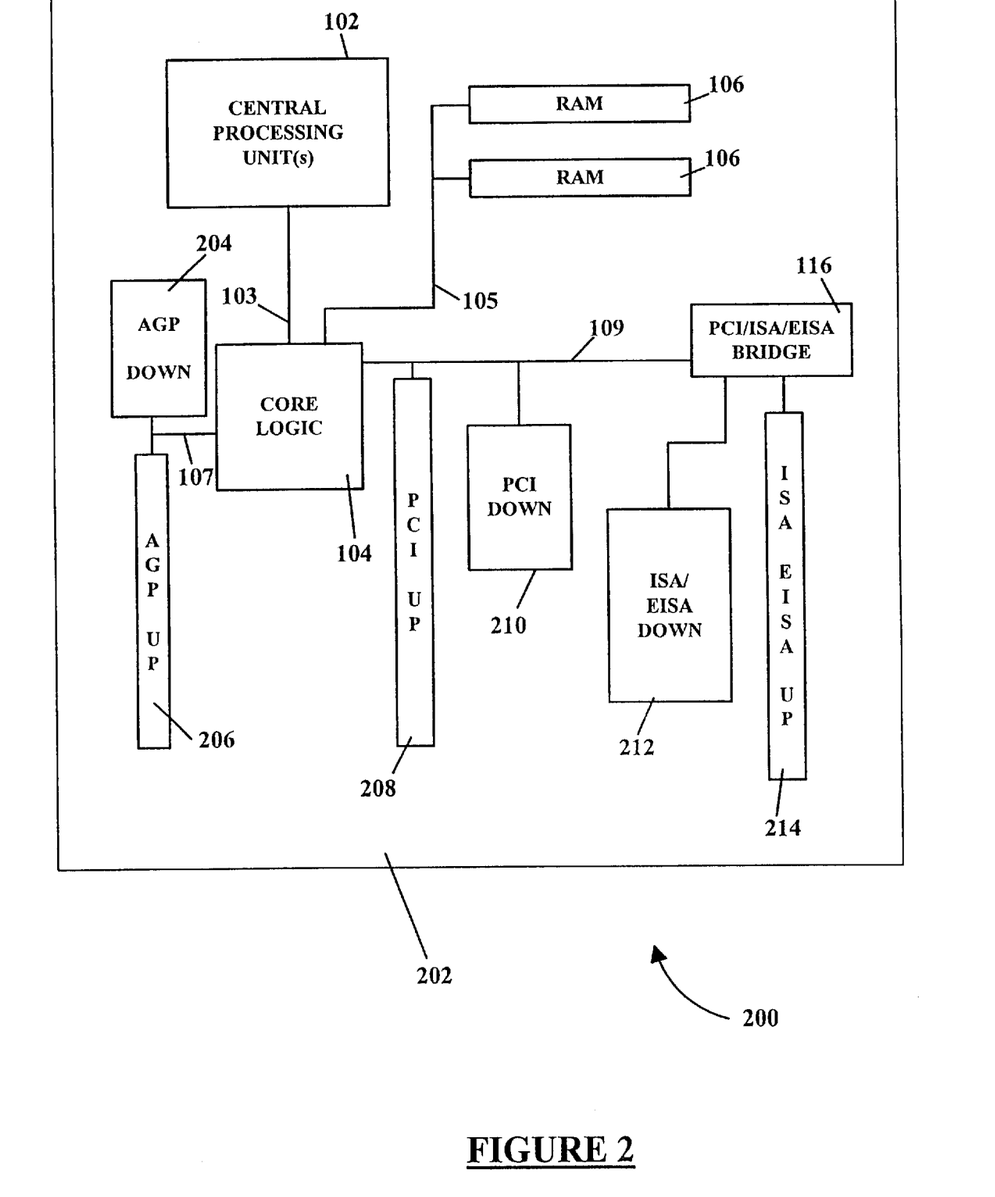
FIG. 2 is a schematic block diagram in plan view of a computer system motherboard with logic components and connectors thereon.

Referring now to FIG. 2, a schematic functional block diagram of a computer system motherboard, according to FIG. 1, is illustrated in plan view. The motherboard of the computer system 100 is generally represented by the numeral 200. The motherboard 200 comprises a printed circuit board 202 on which components and connectors are mounted thereto. The printed circuit board 202 comprises conductive printed wiring which is used to interconnect the components and connectors thereon. The conductive printed wiring (illustrated as buses 103, 105, 107 and 109) may be arranged into signal buses having controlled impedance characteristics. On the printed circuit board 202 are the core logic 104, CPU(s) 102, RAM 106, PCI/ISA/EISA bridge 116, ISA/EISA connectors 214, PCI connectors 208 and AGP connector 206. Also on the printed circuit board 202 are the on-board controllers: AGP controller 204, PCI controller 210 and ISA/EISA controller 212. The on-board controllers 204, 210 and 212 are integral to and supplied with the factory manufactured printed circuit board 202 and thus are part of the original factory computer system 100. These on-board controllers are typically lower cost alternatives to plug-in upgrade controllers that may be inserted into the various bus connectors 206, 208 and 214. It is contemplated and within the scope of the present invention that any number of plug-in upgrade controllers may be substituted for any or all of the on-board controllers of the computer system 100.

Figure 3:
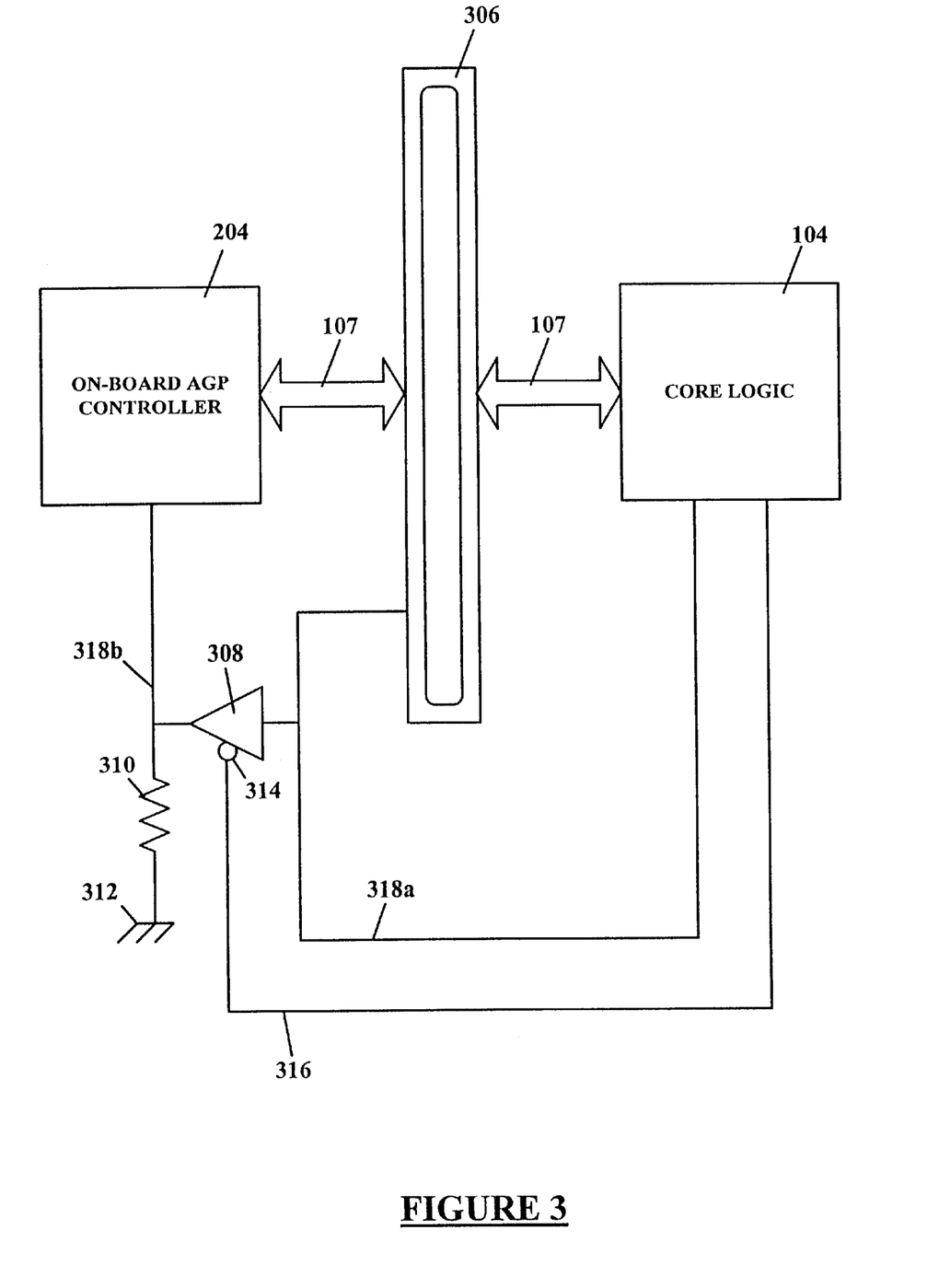
FIGS. 3 and 3A are schematic block diagrams and circuitry of two embodiments of the invention.

Referring now to FIG. 3, a schematic block diagram and circuitry of an embodiment of the present invention is illustrated. An AGP connector 306 is connected to the AGP bus 107 that is also connected to an on-board AGP controller 204 and the core logic 104. A RESET#" (active low) signal line 318a is connected from the core logic chipset 104 to an input of a signal buffer 308 and a RESET# connection (not illustrated, see AGP specification for connector pin number) at the AGP connector 306. The buffer 308, preferably, is a tri-state device, i.e., its output may be disabled to become a high impedance. The output of the buffer 308 may be controlled by a control signal at its inverting control input 314. An AGPDN_DIS signal line 316 from the core logic chipset 104 is connected to the inverting control input 314. The core logic chipset 104 may thus enable or disable the tri-state output of the buffer 308. One end of a pull down signal resistor 310 is connected to the output of the buffer 308 and a RESET# connection of the AGP on-board controller 204. The other end of the pull down signal resistor 310 is connected to a common system ground bus 312.

When the output of the buffer 308 is in a high impedance state (AGPDN_DIS=1), the resistor 310 pulls the RESET# connection of the on-board controller 204 to ground over RESET# signal line 318b, irregardless of the signal level of the RESET# signal line 318a. When the output of the buffer 308 is active (AGPDN_DIS=0), the RESET# signal line 318b follows the signal levels of the RESET# signal line 318a. Thus the AGPDN_DIS signal line 316 from the core logic chipset 104 may be used to initially maintain a RESET# active signal on the on-board controller 204 so as to keep it in reset while the computer system 100, during POST, determines whether there is an upgrade controller plugged into the connector 306. If an upgrade controller is found, it is then configured and the AGPDN_DIS remains at a logic 0, always keeping the on-board controller 204 in an offline reset condition. The buffer 308 does not introduce any time delay in critical timing circuits since only a non-critical timing DC level signal line is affected (RESET#). The upgrade controller connector 306 does not have any buffer in line with its reset signal line 318a so that no time delays are introduced by the present invention. It is contemplated and within the scope of this invention that the signal line 316 may be connected to the ROMBIOS controller instead of the core logic chipset 104, or any other controller such as, for example, SIO in the computer system since its control and timing are determined only during POST.

During the computer system startup power-on-self-test (POST), if an up controller is inserted in the AGP expansion connector 306, it will be enabled, i.e., the RESET# signal 318a connected thereto will be deactivated so that it may respond to PCI queries during POST by asserting the FRAME# signal (more fully described in the PCI specification referred to hereinabove). The down controller 204 on the motherboard 200 has its RESET# signal 318b asserted through the resistor 310, thus the down controller 204 cannot response to any PCI queries during POST. If there is no up controller response during POST, the present invention causes the AGPDN_DIS signal 316 to be deasserted (AGPDN_DIS=0) which enables the output of the buffer 308. Once the output of the buffer 308 is enabled, the RESET# signal 318b now follows the RESET# signal 318a (which is not asserted) and the down controller 204 may respond and be configured during POST. A time delay may be inserted between deassertion of the AGPDN_DIS signal 316 and the down controller RESET# signal on line 318b. Time delay may be determined so that the computer system signal setup criteria are maintained. As an example, but not limitation, a one millisecond time delay may be used in the present embodiment.

Figure 3A:
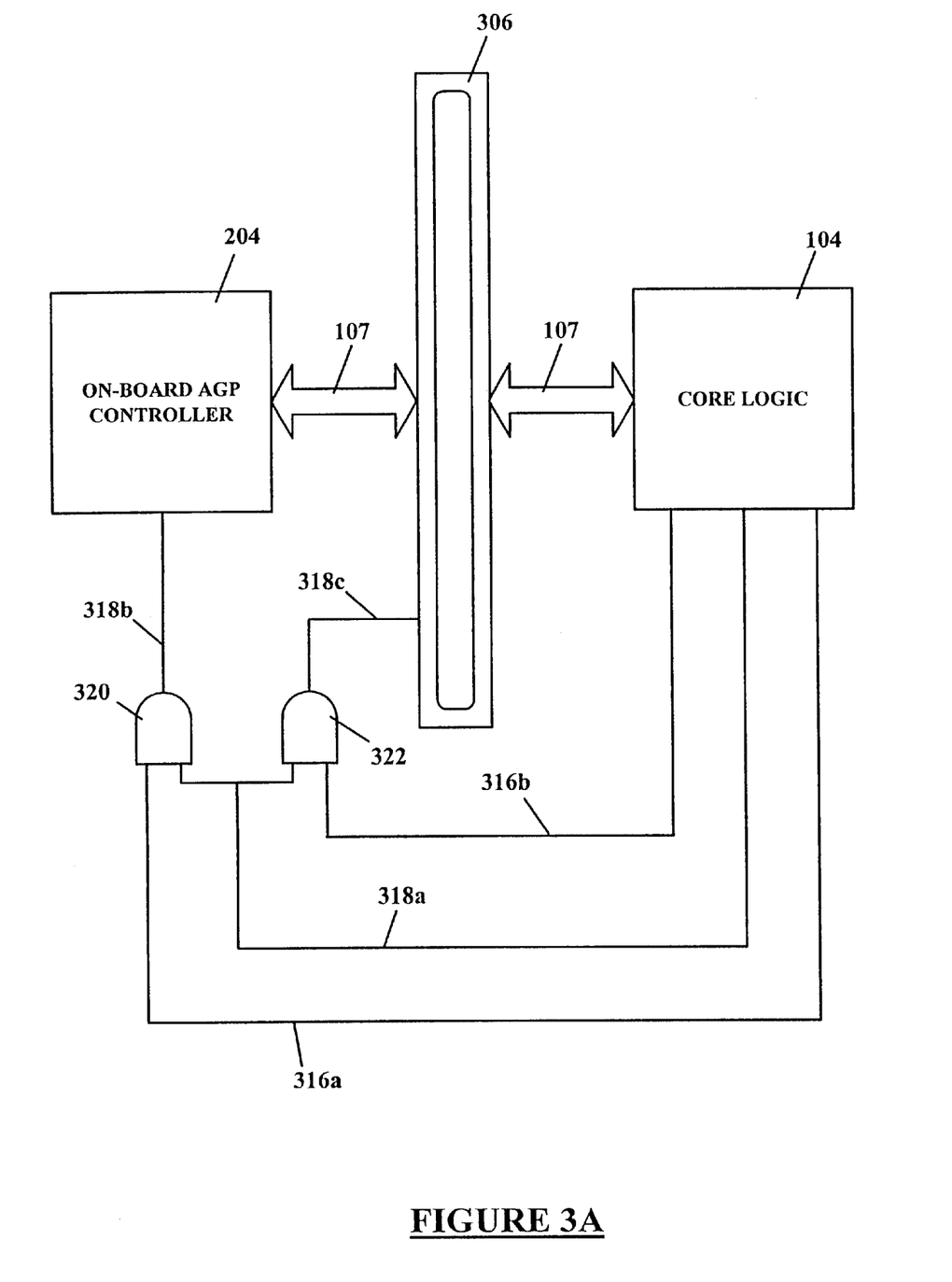

Another embodiment of the invention may use AND gates instead of the buffer 308. eferring to FIG. 3A, a schematic block diagram and circuitry of this is illustrated. An AND gate 320 is substituted for the buffer 308 and resister 310. Another AND gate 322 is also added between the system RESET# signal line 318a and the RESET# input 318c of the upgrade controller connector 306. When the AGPDN_DIS# signal line 316a is at a logic one level, the output of the AND gate 320 will follow the logic levels of the system RESET# signal line 318a. However, when the AGPDN_DIS# 316a is at a logic zero level, the output of the AND gate 320 remains low, thus keeping the down controller 204 in a reset condition. Similarly, the AND gate 322 output follows the logic levels of the system RESET# signal line 318a only when the AGPUP_DIS# signal line 316b is at a logic one level. When the AGPUP_DIS# 316b is at a logic zero level, the output of the AND gate 322 remains low, thus keeping any up controller in connector 306 in a reset condition.

Another embodiment of the invention utilizes the circuit illustrated in FIG. 3A to effectively disable both the up and down controllers when desired. This feature of the invention may be used to disable an entire bus by forcing all of the RESET# signal lines to a reset condition for each of the peripheral controllers on that bus. It is contemplated and within the scope of the invention that every down controller and connector for up controllers may have an AND gate connected thereto so that each of these controllers' RESET# signal inputs may be independently controlled. One of ordinary skill in the art would readily understand that a RESET signal having a logic one for the reset condition is contemplated and within the scope of the invention.

Figure 4:
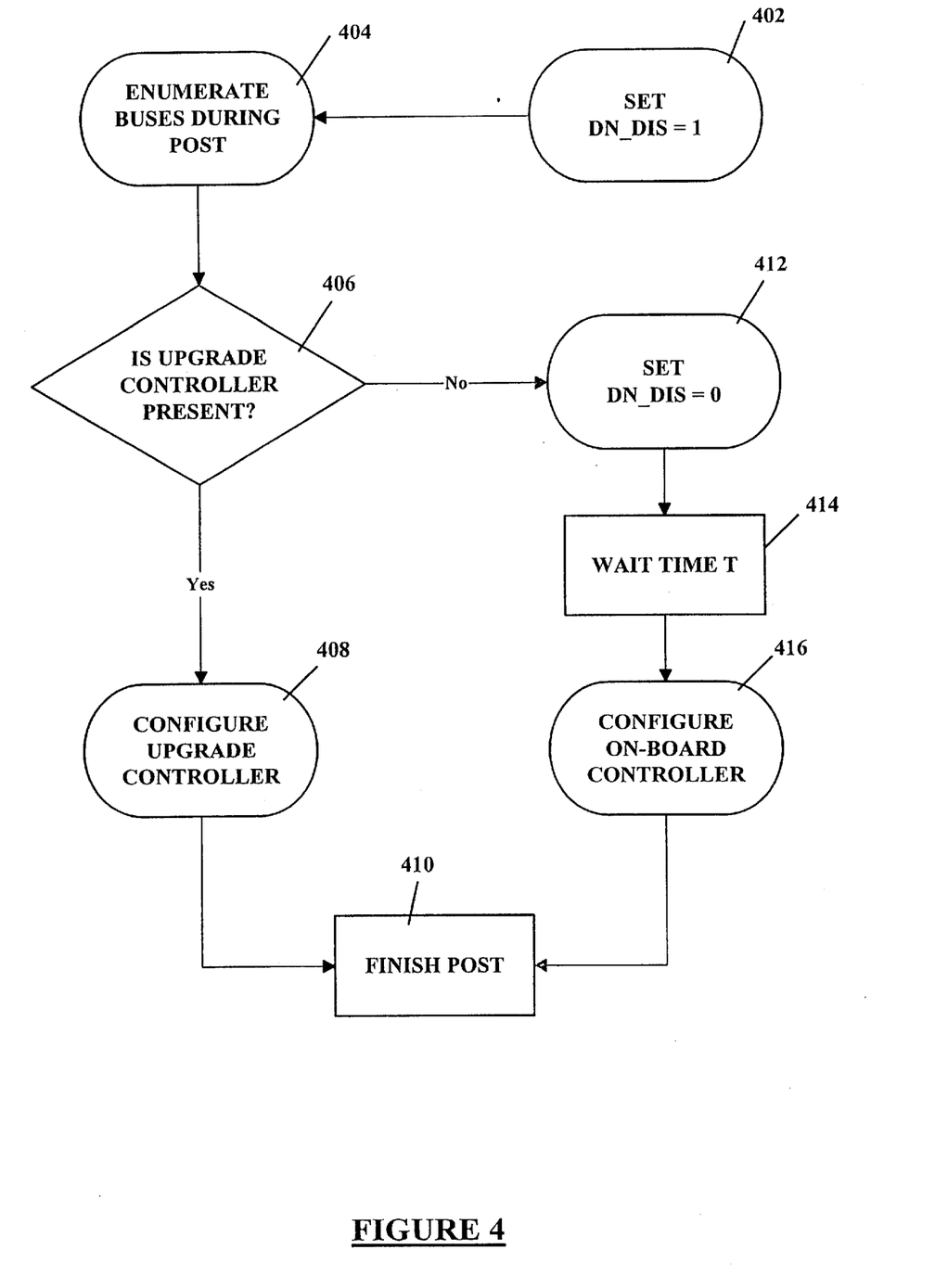
FIG. 4 is a schematic logic flow diagram according to the present invention.

Referring now to FIG. 4, a logic flow diagram, according to the invention, is illustrated. In step 402, the computer system 100 sets the down controller disable signal (hereinafter ("DN_DIS") to a logic 1. In step 404, the various computer buses are enumerated during POST to locate the devices connected thereto. The ROMBIOS 140 of the computer system 100 contains instructions that check for an upgrade controller in step 406, and if the upgrade controller is found it is configured in step 408 during the normal operation of POST. If the upgrade controller does not respond, i.e., is not present, DN_DIS is reset to a logic 0 in step 412. In step 414, the computer system waits a predetermined time T, for example but not limitation—1 millisecond, then in step 416 the on-board controller is found and configured during POST. After all devices are found and configured, POST finishes in step 410.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having on-board peripheral controllers and provisions for adding upgrade peripheral controllers, said system comprising:

a computer system motherboard;

a central processing unit connected to a host bus on said motherboard;

a random access memory connected to a random access memory bus on said motherboard;

an on-board peripheral controller connected to a peripheral bus on said motherboard;

a connector adapted to receive an upgrade peripheral controller, said connector connected to said peripheral bus;

a core logic chipset connected to said host bus, said random access memory bus and said peripheral bus;

a first logic circuit for holding said on-board peripheral controller in reset;

said first logic circuit having an output connected to a reset input of said on-board peripheral controller, a first input connected to a reset signal of said computer system and a second input for controlling whether the output of said logic circuit maintains an asserted reset signal logic level on the reset input of said on-board peripheral controller or the output follows the logic levels of the reset signal of said computer system; and     a second logic circuit for generating a disable signal to the second input of said first logic circuit, wherein         the disable signal is asserted during initial startup of said computer system so that the output of said first logic circuit maintains the asserted reset signal logic level on the reset input of said on-board peripheral controller while the computer system determines whether an upgrade peripheral controller is present in said connector,         if the upgrade peripheral controller is determined to be present in said connector then the computer system configures the upgrade peripheral controller and continues to maintain the asserted disable signal, and         if the upgrade peripheral controller is not present in said connector then the disable signal is deasserted and the computer system configures said on-board peripheral controller.

2. The computer system of claim 1, wherein said central processing unit is a plurality of central processing units.

3. The computer system of claim 1, wherein said on-board peripheral controller is an accelerated graphics port (AGP) video controller, said connector is an AGP connector and said peripheral bus is an AGP bus.

4. The computer system of claim 1, wherein said on-board peripheral controller is a peripheral component interconnect (PCI) controller, said connector is a PCI connector and said peripheral bus is a PCI bus.

5. The computer system of claim 1, wherein said on-board peripheral controller is a small computer system interface (SCSI) controller, said connector is a SCSI connector and said peripheral bus is a SCSI bus.

6. The computer system of claim 1, wherein said on-board peripheral controller is an extension to industry standard architecture (EISA) controller, said connector is an EISA connector and said peripheral bus is an EISA bus.

7. The computer system of claim 1, wherein said on-board peripheral controller is an industry standard architecture (ISA) controller, said connector is an ISA connector and said peripheral bus is an ISA bus.

8. The computer system of claim 1, wherein said on-board peripheral controller is a super input-output (SIO) controller.

9. The computer system of claim 1, wherein said core logic chipset is at least one integrated circuit.

10. The computer system of claim 1, wherein said first logic circuit comprises:
    a buffer having a signal input as said first input, a tri-state signal output as said output, and a control input as said second input for enabling and disabling the tri-state signal output; and
    a resistor connected between the tri-state signal output and a ground bus of said computer system, wherein the disable signal is connected to said second input and when asserted will disable the tri-state signal output thereby allowing said resistor to assert the reset signal logic level on the reset input of said on-board peripheral controller.

11. The computer system of claim 1, wherein said first logic circuit comprises:
    a first AND gate having a first signal input as said first input, a second signal input as said second input and a signal output as said output.

12. The computer system of claim 11, further comprising:
    a second AND gate having a first signal input connected to the reset signal of said computer system, a second signal input connected to a second control signal and a signal output connected to a reset input of said connector, where said second control signal may be used to hold the reset input of said connector in a reset condition.

13. The computer system of claim 1, wherein said second logic circuit is part of said core logic chipset.

14. The computer system of claim 1, wherein said second logic circuit is part of a super input output controller.

15. The computer system of claim 1, wherein said second logic circuit is part of a read only memory basic input output system (ROMBIOS) controller.

16. The computer system of claim 1, wherein the computer system waits a predetermined time after deasserting the disable signal and then configures said on-board peripheral controller.

17. An apparatus for automatically detecting and configuring an upgrade peripheral controller in a computer system having an existing standard peripheral controller, said apparatus comprising:
    a first logic circuit for holding a first peripheral controller in reset;
    said first logic circuit having an output connected to a reset input of said first peripheral controller, a first input adapted for connection to a reset signal of a computer system, and a second input for controlling whether the output of said logic circuit maintains an asserted reset signal logic level on the reset input of said first peripheral controller or the output follows the logic levels of the first input; and
    a second logic circuit for generating a disable signal to the second input of said first logic circuit, wherein
    the disable signal is asserted during initial startup of the computer system so that the output of said first logic circuit maintains the asserted reset signal logic level on the reset input of said first peripheral controller while the computer system determines whether a second upgrade peripheral controller is present,
        if the second upgrade peripheral controller is determined to be present then the computer system configures the second upgrade peripheral controller and continues to maintain the asserted disable signal, and
        if the second upgrade peripheral controller is not present then the disable signal is deasserted and the computer system configures said first peripheral controller.

18. The apparatus of claim 17, wherein said first logic circuit comprises:
    a buffer having a signal input as said first input, a tri-state signal output as said output, and a control input as said second input for enabling and disabling the tri-state signal output; and
    a resistor connected between the tri-state signal output and a ground bus, wherein the disable signal is connected to said second input and when asserted will disable the tri-state signal output thereby allowing said resistor to assert the reset signal logic level on the reset input of said first peripheral controller.

19. The computer system of claim 17, wherein said first peripheral controller is configured a predetermined time after the disable signal is deasserted.

20. The computer system of claim 17, wherein said first logic circuit is a first AND gate.

21. The computer system of claim 20, further comprising a second AND gate for disabling second upgrade peripheral controller.

* * * * *